US010371009B2

(12) United States Patent
De Sousa et al.

(10) Patent No.: US 10,371,009 B2
(45) Date of Patent: Aug. 6, 2019

(54) TURBOMACHINE CASING COMPRISING A CAVITY-FREE SHROUD AND YOKES REINFORCED BY STIFFENERS

(71) Applicant: SNECMA, Paris (FR)

(72) Inventors: Mario Cesar De Sousa, Moissy-Cramayel (FR); Benoit Argemiro Matthieu Debray, Moissy-Cramayel (FR); Paul Moreau, Moissy-Cramayel (FR); Frederic Noel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 492 days.

(21) Appl. No.: 15/113,543

(22) PCT Filed: Jan. 20, 2015

(86) PCT No.: PCT/FR2015/050133
§ 371 (c)(1),
(2) Date: Jul. 22, 2016

(87) PCT Pub. No.: WO2015/110749
PCT Pub. Date: Jul. 30, 2015

(65) Prior Publication Data
US 2017/0030222 A1 Feb. 2, 2017

(30) Foreign Application Priority Data

Jan. 23, 2014 (FR) ...................................... 14 50579

(51) Int. Cl.
*F01D 25/24* (2006.01)
*F01D 25/16* (2006.01)
(Continued)

(52) U.S. Cl.
CPC ........... *F01D 25/243* (2013.01); *B64D 27/26* (2013.01); *F01D 25/162* (2013.01); *F01D 25/28* (2013.01);
(Continued)

(58) Field of Classification Search
CPC ....... F01D 25/243; F01D 25/162; F01D 25/28; B64D 27/26; F05D 2240/90; F05D 2250/75; F05D 2260/30; F05D 2260/31
See application file for complete search history.

(56) References Cited

U.S. PATENT DOCUMENTS 5,452,575 A * 9/1995 Freid ..................... B64D 27/18
244/54

FOREIGN PATENT DOCUMENTS

| FR | 2102187 A1 | 4/1972 |
| WO | WO 2008121047 A1 | 10/2008 |
| WO | WO 2012150418 A1 | 11/2012 |

OTHER PUBLICATIONS

International Search Report and Written Opinion in PCT/FR2015/050133 dated May 20, 2015, with English translation. 17 pages.

(Continued)

*Primary Examiner* — Richard A Edgar
(74) *Attorney, Agent, or Firm* — Womble Bond Dickinson (US) LLP

(57) ABSTRACT

The invention relates to a turbomachine casing (1) comprising: a hub (2), an outer shroud (3), and yokes (11) projecting from the outer shroud (3), for attaching the housing (1), characterized in that it comprises at least one stiffener (10) extending between pairs of yokes (11) facing each other, and comprising a central part (18) and side arms (19) projecting from the central part (18).

8 Claims, 7 Drawing Sheets

(51) Int. Cl.
*F01D 25/28* (2006.01)
*B64D 27/26* (2006.01)

(52) U.S. Cl.
CPC ...... *F05D 2220/32* (2013.01); *F05D 2240/90* (2013.01); *F05D 2250/75* (2013.01); *F05D 2260/30* (2013.01); *F05D 2260/31* (2013.01)

(56) References Cited

OTHER PUBLICATIONS

Search Report and Written Opinion in French Application No. 1450579 dated Oct. 29, 2014, with English translation coversheet. 7 pages.

* cited by examiner

TURBOMACHINE CASING COMPRISING A CAVITY-FREE SHROUD AND YOKES REINFORCED BY STIFFENERS

FIELD OF THE INVENTION

The invention relates to a casing of a turbine engine, particularly an exhaust casing of a turbine engine.

PRESENTATION OF THE PRIOR ART

The exhaust casing is a structural part of a turbine engine conventionally positioned at the output of a turbine, ahead of the ejection nozzle.

The casing comprises a hub, an outer shell ring and a plurality of structural arms positioned circumferentially between the hub and the outer shell ring.

In order to attach the exhaust casing to a support of the turbine engine, it is known from patent application FR 2975131 to provide attachment points called clevises protruding from the outer shell ring, the lugs whereof extend radially and having bores to receive link rods 103 (FIG. 1).

The tension and compression forces induced by these link rods on the clevises induce bending moments which can damage the shell ring as well as the arms of the casing.

This results from the offset between the bores of the clevises and the neutral axis of the shell ring.

FR 2975131 proposes the creation of a depression in the shell ring so as to bring the bores of the clevises closer to the neutral axis of the shell ring. This solution, however, is less effective if the shell ring has a small thickness, which is desirable for reducing the mass of the casing.

Another solution illustrated in FIG. 1, consists of creating bosses 100 to lower the clevises 101 and move them closer to the neutral axis of the shell ring.

These bosses, however, have a negative aerodynamic impact on the flow in the stream, which is increased when the structural arms are short.

In addition, in the prior art solutions, it is difficult to machine the clevises because they are positioned in proximity to the outer shell ring, which implies that the machining tools encounter obstacles.

PRESENTATION OF THE INVENTION

In order to reduce the disadvantages of the prior art, the invention proposes a turbine engine casing comprising a hub, an outer shell ring, and clevises protruding from the outer shell ring, for attaching the casing, characterized in that it comprises at least one stiffener extending between pairs of clevises facing each other.

The invention is advantageously supplemented by the following features, taken alone or in any one of their technically possible combinations:
- the ends of the stiffener are integral with the clevises;
- the ends of the stiffener are attached to the clevises via attachment elements;
- the stiffener has a central part and lateral arms protrude from the central part;
- the stiffener has the general shape of an H;
- the lateral arms have a section wider in their center than at their ends;
- the lateral arms have a section narrower in their center than at their ends;
- the lateral arms have a section of substantially constant width;
- said casing is an exhaust casing of a turbine engine and comprises a plurality of structural arms positioned circumferentially between the hub and the outer shell ring, the clevises being positioned in alignment with the structural arms.

The invention also relates to a turbine engine comprising a casing as described previously, link rods attached on the one hand to the clevises of the casing via attachment elements, and on the other hand to a support of the turbine engine, the stiffener being configured to assume the forces applied by the attachment elements to the casing.

PRESENTATION OF THE FIGURES

Other features and advantages of the invention will be revealed from the description that follows, which is purely illustrative and not limiting, and must be read with regard to the appended drawings in which.

Figure 10:
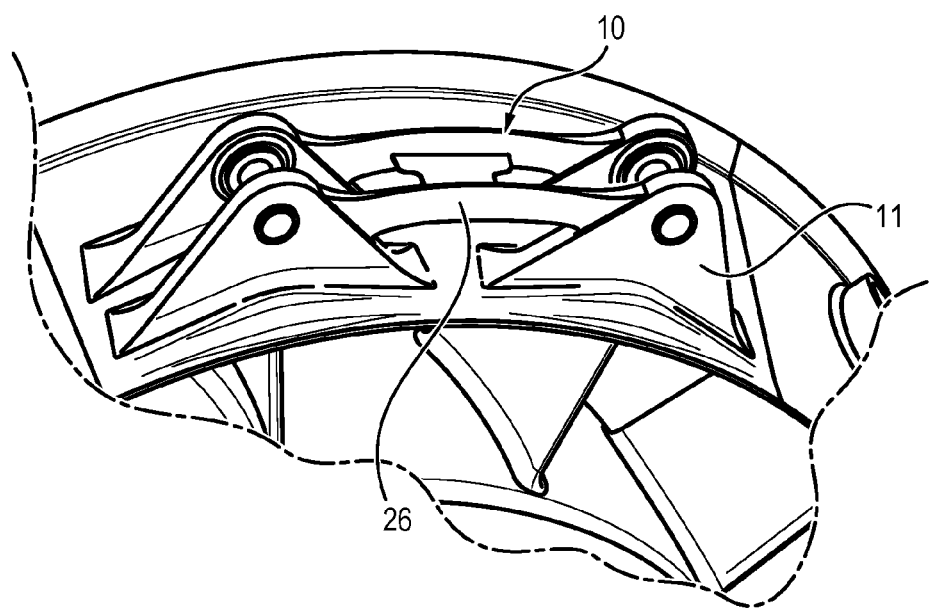
Figure 11:
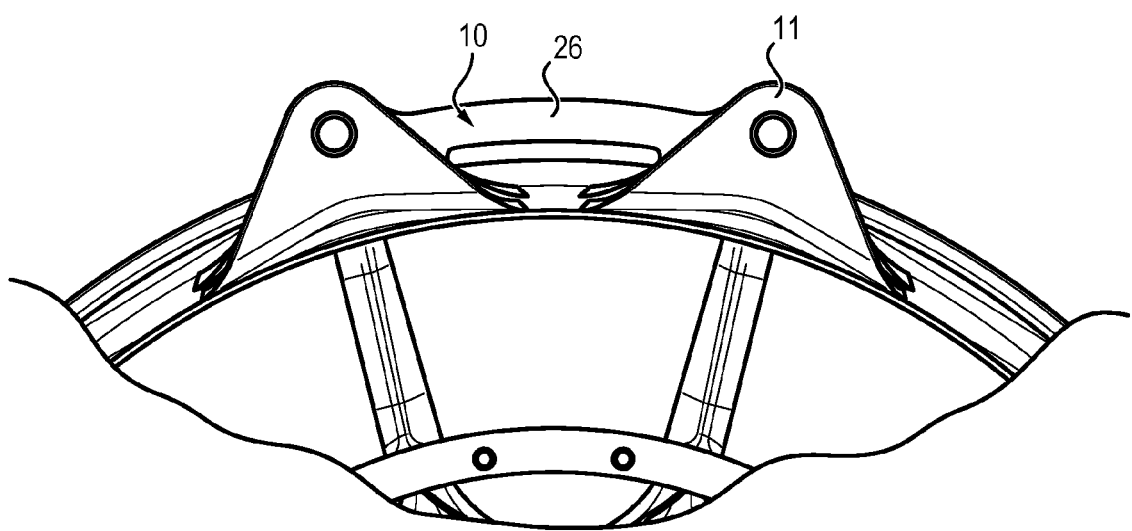
Figure 12:
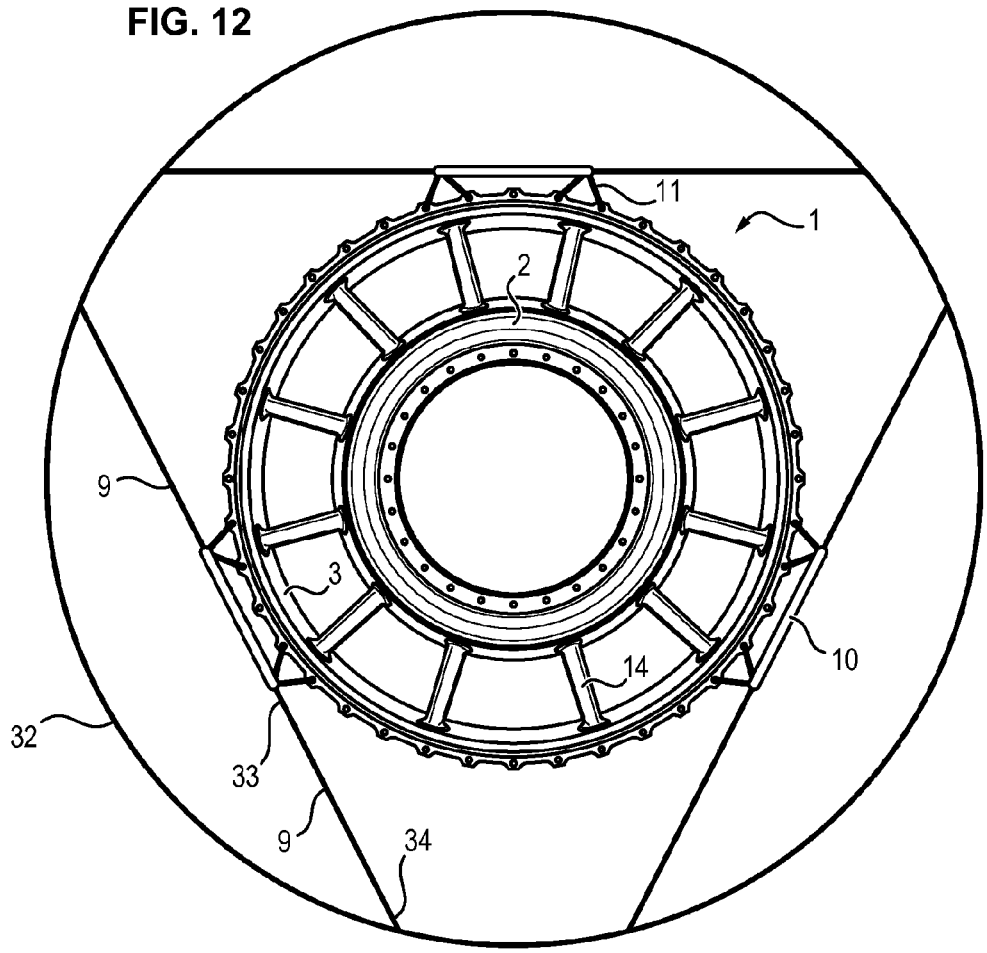
Figure 13:
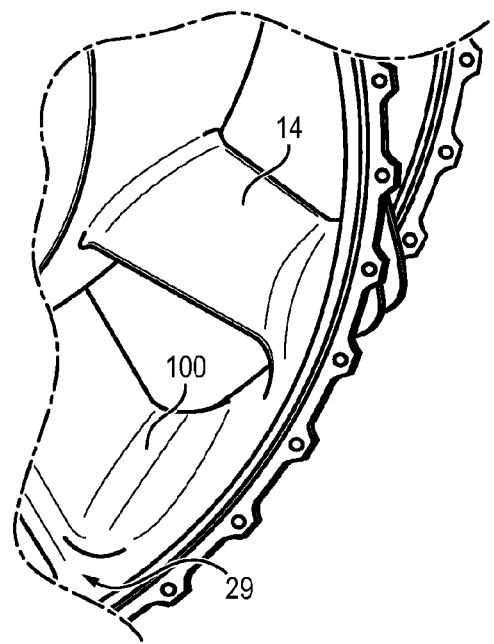

la FIG. 10 shows another possible embodiment for the shape of the stiffener;

FIG. 11 shows, in side view, the embodiment of FIG. 10;

FIG. 12 shows a casing connected to a turbine engine support by attachment elements;

FIG. 13 shows a zone located upstream of the bosses in a casing according to the prior art.

DETAILED DESCRIPTION

Figure 1:
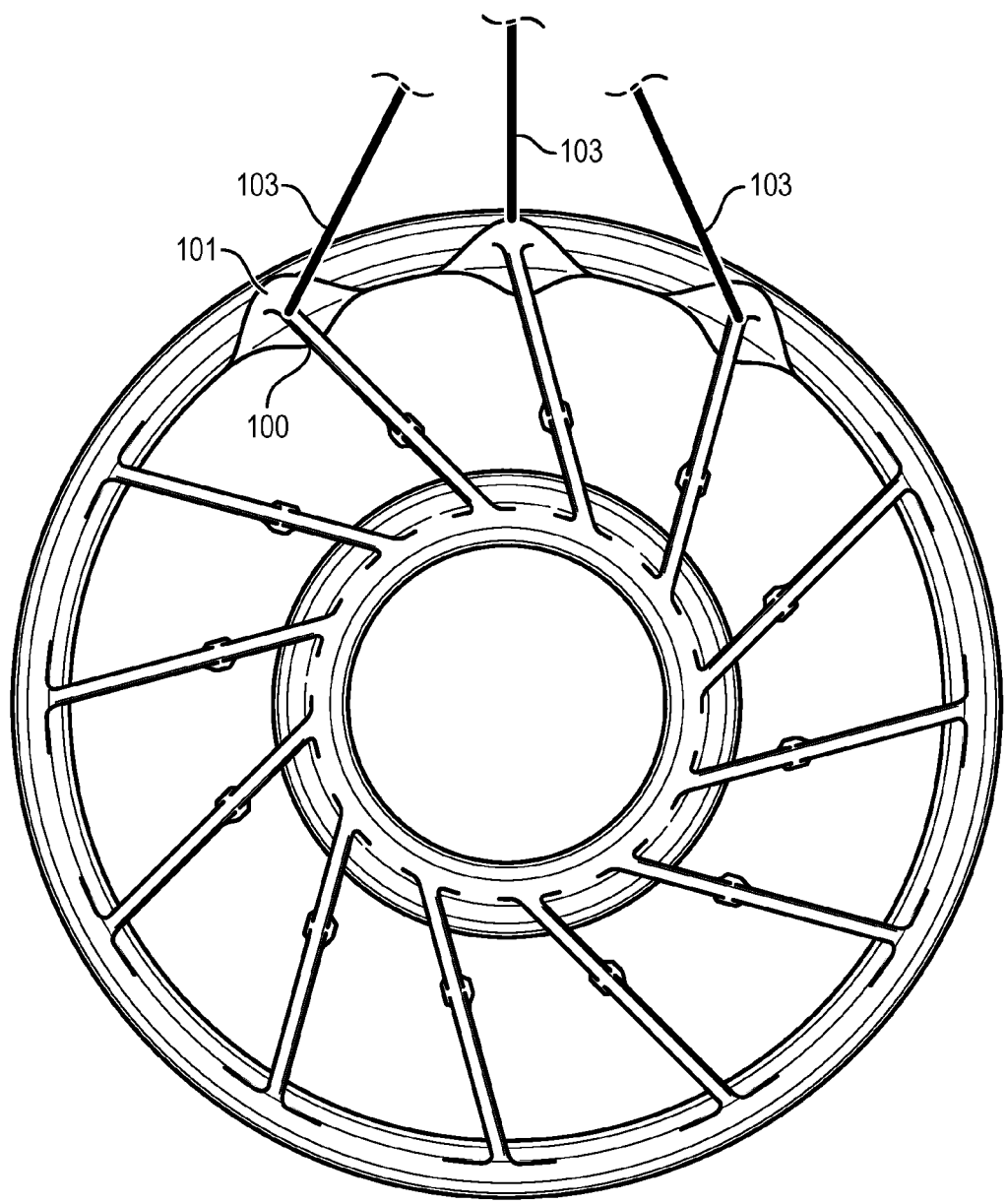
FIG. 1 shows an exhaust casing according to the prior art, comprising bosses in the space between the hub and the outer shell ring.
Figure 2:
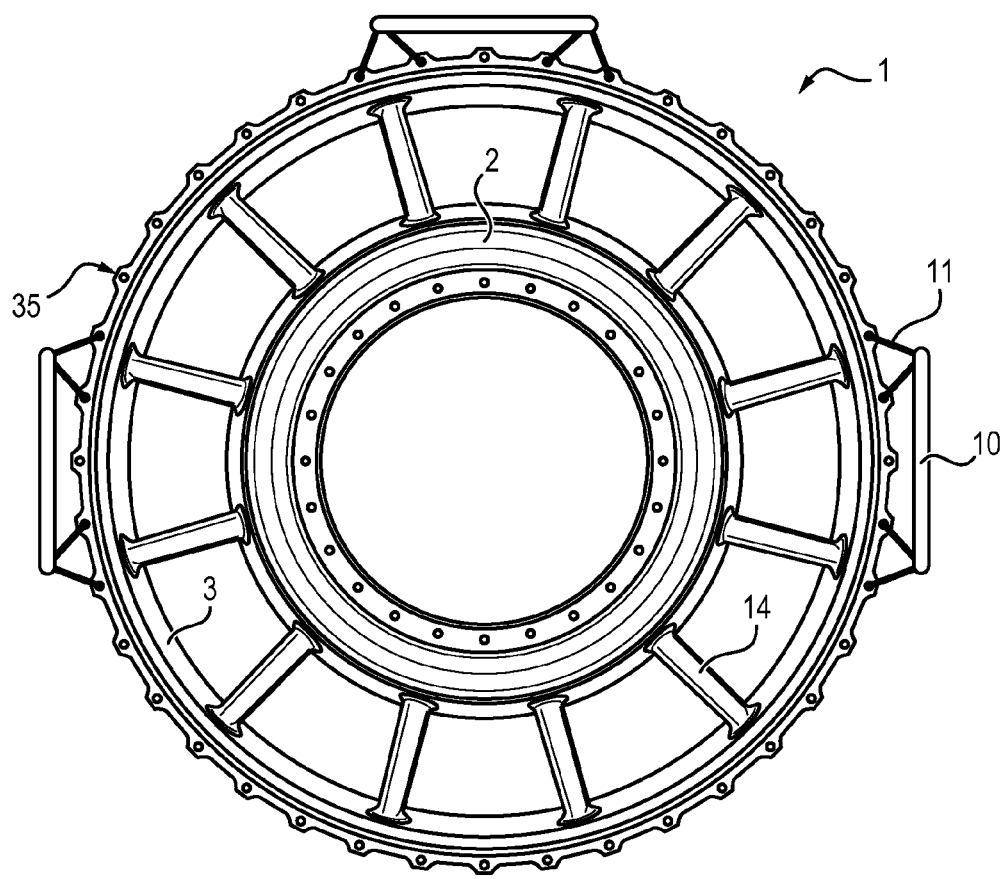
FIG. 2 shows a casing according to an embodiment of the invention.
Figure 3:
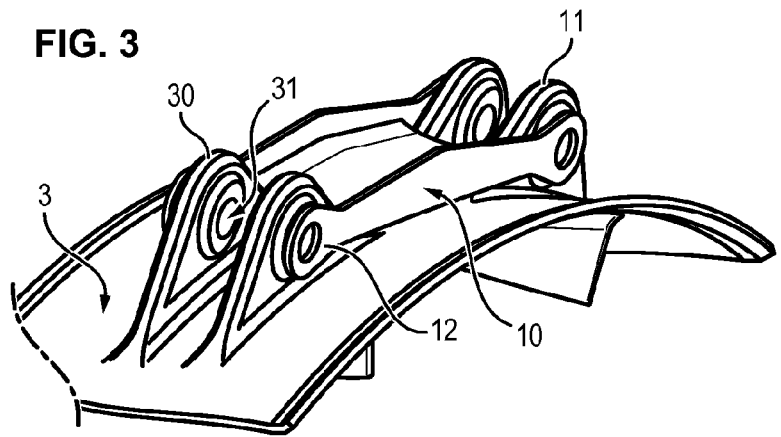
FIG. 3 shows pairs of clevises protruding on the shell ring, and a distinct clevis stiffener.
Figure 4:
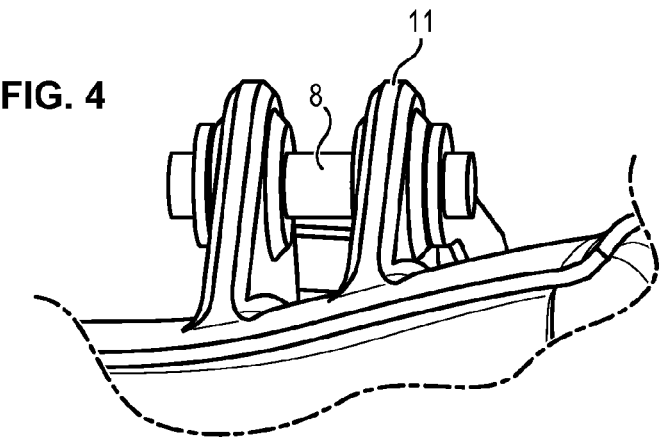
FIG. 4 shows a connection between the stiffener and the clevises using an attachment piece, conforming to the embodiment of FIG. 3.
Figure 5:
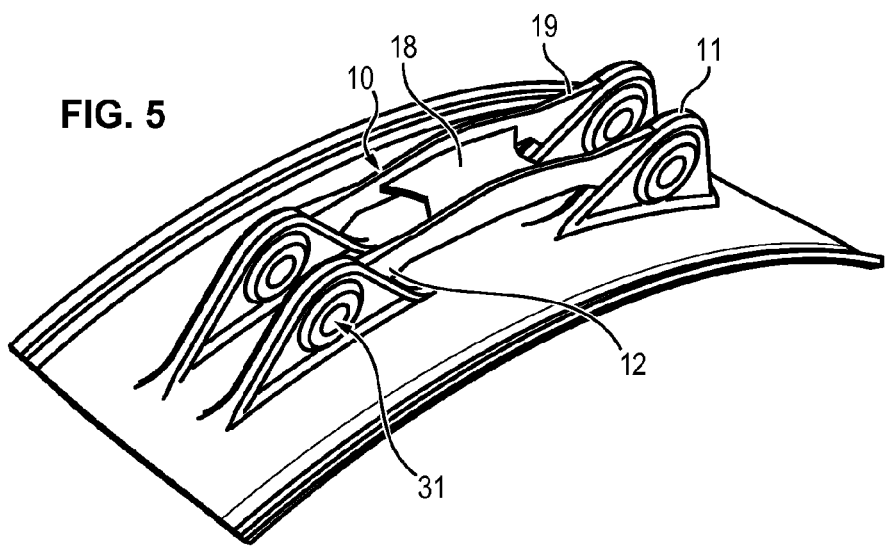
FIG. 5 shows an embodiment wherein the stiffener is integral with the clevises.

Shown in FIG. 2 is an embodiment of a casing 1 of a turbine engine according to the invention.

This is for example an exhaust casing of a turbine engine.

The casing 1 comprises a hub 2 and an outer shell ring 3.

The outer shell ring 3 has for example the general shape of a polygonal cylinder or cylinder of revolution. It has an attachment flange 35, comprising a plurality of bores for attachment to another casing.

In the case of an exhaust casing, the casing 1 also comprises a plurality of structural arms 14. The latter, which can in particular be radial or tangential, are positioned circumferentially and connect the hub 2 and the outer shell ring 3.

What is meant by radial is the radial axis of the turbine engine, which extends radially with respect to the longitudinal axis of the turbine engine, the longitudinal axis being the flow axis of the primary flow of the turbine engine, from upstream to downstream.

What is meant by tangential arm is an arm positioned substantially tangentially with respect to the hub 2, that is with a considerable slope compared to a purely radial arm.

The spaces between the structural arms 14 define the exhaust openings, wherein the flow of the turbine engine circulates (stream).

The casing 1 further comprises clevises 11 protruding on the outer shell ring 3, for attaching the casing, and in particular for receiving attachment elements 8, themselves connected to link rods 9 (FIG. 12) for connecting the casing 1 to a support 32 (FIG. 12) of the turbine engine.

The clevises 11 have lugs 30 having bores 31 for receiving the attachment elements 8, such as shafts for example.

One end 33 (FIG. 12) of the link rods 9 is received and attached (for example by means of the attachment elements 8) between a pair of clevises 11 facing each other, the other end 34 (FIG. 12) being attached to the support 32 of the turbine engine.

The casing 1 further comprises at least one stiffener 10 extending between the pair of clevises 11 facing each other.

According to one possible embodiment, the clevises 11 are positioned two by two facing each other, and side by side.

In the case of an exhaust casing 1 comprising a plurality of structural arms 14 positioned circumferentially between the hub 3 and the outer shell ring 3, the clevises 11 are advantageously positioned in radial alignment with the structural arms 14.

The stiffener 10 extends between two pairs of clevises 11, each pair comprising two clevises facing each other.

In the example illustrated in FIG. 2, the casing 1 comprises six clevises on the circumference of the outer shell ring 3, and three stiffeners 10, each stiffener 10 extending between two interlocking pairs of clevises 11. This number and this arrangement are not limiting, however.

The stiffener 10 extends in the main direction of the link rods 9, so as to assume the forces applied by the link rods 9 to the casing 1. This makes it possible to prevent the application of bending moments to the casing 1.

In this case, the stiffeners 10 extend mainly along a direction substantially tangential to the outer shell ring 3.

The ends 12 of the stiffener 10 are, for their part, aligned with the bores 31 of the facing clevises 11.

In FIG. 12, an exhaust casing 1 is shown attached to a support 32 of a turbine engine. As can be seen, the link rods 9 are attached on the one hand to the clevises 11 of the casing 1 and on the other hand to the support 32.

Taking into account the fastening of the casing 1, the buckling load of the structural arms 14 is relatively low, but this fastening induces considerable bending moments on the shell ring 3 and the top of the arms 14, which are taken up by the stiffeners 10.

According to one embodiment, the ends 12 of the stiffener 10 are integral with the clevises 11.

The stiffener 10 can be obtained by different manufacturing methods, such as stamping, forging or casting, and made integral with the clevises 11 by casting or welding.

In this case, the forces imposed by the link rods 9 are assumed by the clevises 11 reinforced by the stiffeners 10 by means of the attachment elements 8, which avoids mechanical loading of the shell ring 3 and, as the case may be, the structural arms 14.

According to one possible example, the casing 1 comprises several independent sectors, produced by casting, the interlocking whereof makes it possible to obtain the casing 1. Each sector comprises a portion of the arm, a portion of the shell ring, and, as the case may be, one or more pairs of protruding clevises.

According to this example, a portion of the stiffener 10 is made integral with each pair of clevises 11 of each sector during manufacture.

During assembly of the sectors of the casing 1, the portions of the stiffener 10 are then secured, for example by welding.

In practice, a central part is generally applied and welded to the portions of the stiffener 10 integral with each pair of clevises of each sector, so as to facilitate the manufacture and mutual alignment of the parts of the stiffener 10.

According to another embodiment, the stiffener 10 is applied and attached to the pairs of clevises 11. The clevises 11 and the stiffener 10 are, in this case, two distinct parts.

To this end, the ends 12 of the stiffener 10 are attached to the clevises 11 via attachment elements 8, such as shafts, which are common to the stiffeners 10 and to the rods 9.

In this embodiment, the forces applied by the attachment elements 8 are apportioned between the clevises 11 and the stiffeners 10.

The invention makes it possible to simplify the manufacture of the casing. In fact, in the prior art, the clevises 11 have a low radial position, near the outer shell ring 3, which complicates the adjustment of the foundry mold at the recesses, the machining of the clevises and, in particular, the passage of tools for manufacturing the bores of the clevises, due to the proximity of the outer shell ring 3.

Thanks to the invention, the clevises 11 can be protruding on the outer shell ring 3, and it is no longer necessary to align the clevises 11 with the neutral axis of the shell ring. The stiffeners 10, possibly in cooperation with the clevises 11, make it possible to assume the bending moment induced by the nonalignment of the bores 31 of the clevises 11 with the neutral axis of the shell ring 3. Consequently, access to the clevises 11 is improved, and the machining of the clevises 11 is therefore simplified.

The shape of the stiffener 10 is designed to respond to different forces.

It is advantageous for the stiffener 10 to be manufactured at low cost and have reduced mass, while ensuring the required mechanical strength.

In particular, the stiffener 10 is designed have buckling resistance at least equal to and at best better than that of the shell ring 3, so as to preserve it under extreme forces.

As illustrated in FIGS. 5 to 11, the stiffener 10 can have in particular:
a central part 18, and
lateral arms 19 extending in projection from the central part 18, the ends whereof are connected (by securing or by attachment pieces) to the clevises 11.

The lateral arms 19 extend generally beyond the central part 18 in a direction tangential to the shell ring 3.

The stiffener 10 can in particular have the general shape of an H when seen from above.

Figure 6:
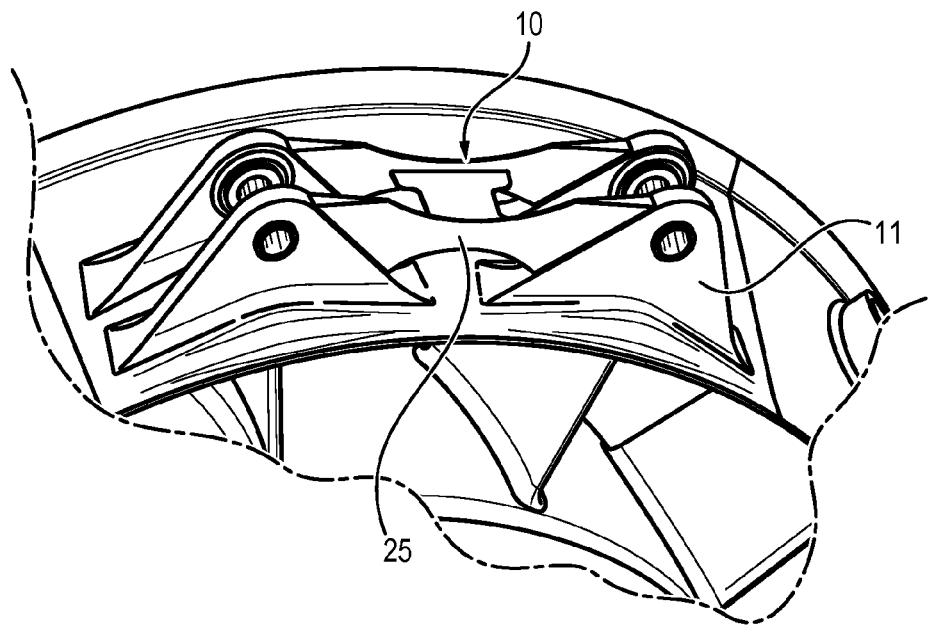
FIG. 6 shows a possible embodiment for the shape of the stiffener.
Figure 7:
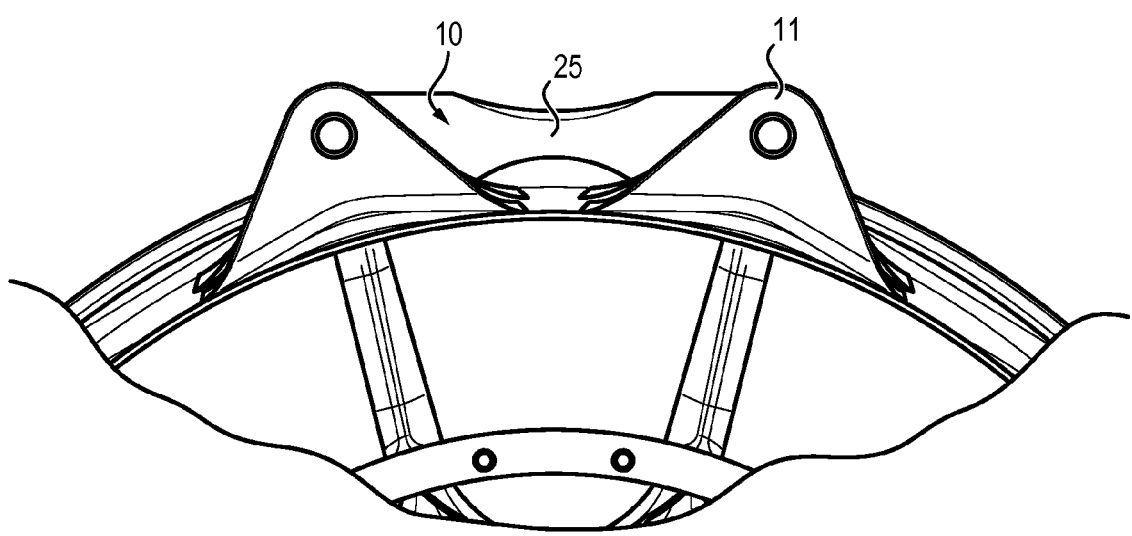
FIG. 7 shows a side view of the embodiment of FIG. 6.

In the example of FIGS. 6 and 7, the lateral arms 19 have a section 25 narrower in their center than at their ends. Thus, the arms 19 taper from their ends connected to the clevises 11 toward their center connected to the central part 18 of the stiffener 10.

In addition, the central section 25 of the lateral arms 19 has, in these figures, a concave external profile.

Figure 8:
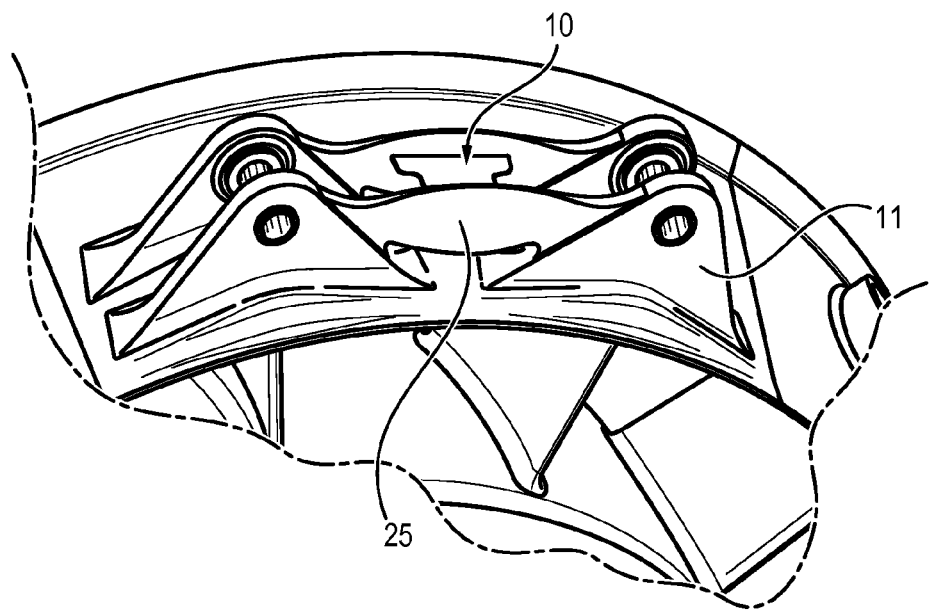
FIG. 8 shows another possible embodiment for the shape of the stiffener.
Figure 9:
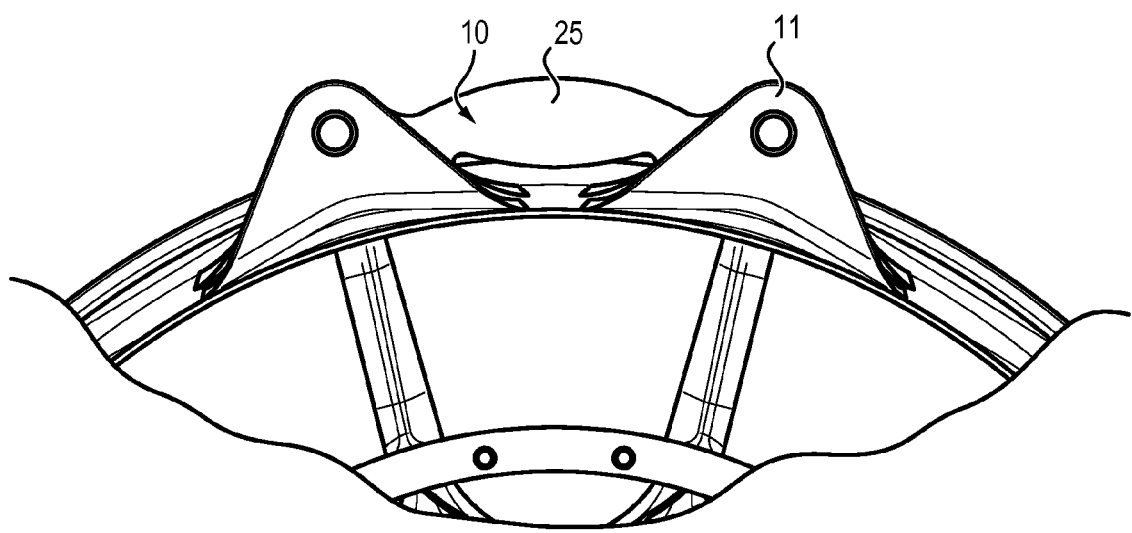
FIG. 9 shows a side view of the embodiment of FIG. 8.

In the example of FIGS. 8 and 9, the lateral arms 19 have a section 25 wider in their center than at their ends. Thus, the arms 19 taper from their center connected to the central part 18 of the stiffener 10 toward their ends connected to the clevises 11.

In addition, the central section 25 of the lateral arms 19 has, in these figures, a convex external profile.

In the example of FIGS. 10 and 11, the lateral arms 19 have a section 26 with a substantially constant width.

These embodiments are only examples, and other forms can be contemplated so as to optimize the dimensioning of mechanical strength and the rationalization of the production mode.

The prior art described a casing comprising recesses, which are eliminated by the object of the invention.

The elimination of these obstacles to flow of the stream improves the performance of the turbine engine.

Moreover, the manufacture of the casing is improved. The clevises, which are remote from the external circumference of the shell ring 3, can be machined simply and effectively, the machining tools not encountering obstacles to their passage.

Moreover, the invention makes it possible to increase the life span of the zones of the casing. In the prior art, the zone upstream of the recesses has a limited lifetime. The elimination of the recesses makes it possible to dispense with this limitation.

In fact, the zone 29 (FIG. 13) located in the prior art upstream (according to the direction of flow in the casing) of the recesses (100), on the external circumference of the hub 3, which has a limited life span, no longer exists because of the invention, due to the elimination of the recesses.

Finally, costs are reduced, and the mass balance is satisfactory with respect to the solutions of the prior art.

The invention claimed is:

1. A turbine engine casing comprising:
   a hub,
   an outer shell ring, and
   clevises protruding from the outer shell ring, for attaching the casing,
   wherein the turbine engine casing further comprises at least one stiffener extending between pairs of clevises facing each other, said at least one stiffener having the general shape of an H, and
   comprising a central part and lateral arms protruding from the central part.

2. The casing according to claim 1, wherein the stiffener comprises ends that are integral with the clevises.

3. The casing according to claim 1, wherein the stiffener comprises ends that are attached to the clevises via attachment elements.

4. The casing according to claim 1, wherein the lateral arms have a section wider in their center than at their ends.

5. The casing according to claim 1, wherein the lateral arms have a section narrower in their center than at their ends.

6. The casing according to claim 1, wherein the lateral arms have a section of substantially constant width.

7. The casing according to claim 1, said casing being an exhaust casing of a turbine engine and comprising a plurality of structural arms positioned circumferentially between the hub and the outer shell ring, the clevises being positioned in alignment with the structural arms.

8. A turbine engine comprising:
   a casing according to claim 1,
   link rods attached on the one hand to the clevises of the casing via attachment elements,
   and on the other hand to a support of the turbine engine,
   the stiffener being configured to assume the forces applied by the link rods to the casing.

* * * * *